(12) United States Patent
Venable (10) Patent No.: US 9,824,604 B2
(45) Date of Patent: Nov. 21, 2017

(54) CREATING ASSESSMENT MODEL FOR EDUCATIONAL ASSESSMENT SYSTEM

(75) Inventor: Dennis L Venable, Marion, NY (US)

(73) Assignee: Conduent Business Services, LLC, Dallas, TX (US)

( * ) Notice: Subject to any disclaimer, the term of this patent is extended or adjusted under 35 U.S.C. 154(b) by 298 days.

(21) Appl. No.: 13/602,375

(22) Filed: Sep. 4, 2012

(65) Prior Publication Data
US 2014/0065594 A1    Mar. 6, 2014

(51) Int. Cl.
*G09B 7/06* (2006.01)
*G09B 7/00* (2006.01)

(52) U.S. Cl.
CPC ............... *G09B 7/06* (2013.01); *G09B 7/00* (2013.01)

(58) Field of Classification Search
USPC .................................. 434/353, 354
See application file for complete search history.

(56) References Cited

U.S. PATENT DOCUMENTS

| | | | | |
|---|---|---|---|---|
| 5,102,341 A * | 4/1992 | Koslin | .......................... | 434/353 |
| 5,177,603 A * | 1/1993 | Kojima | ......................... | 358/518 |
| 5,619,592 A * | 4/1997 | Bloomberg et al. | .......... | 382/175 |
| 6,112,050 A * | 8/2000 | George-Morgan | ........... | 434/353 |
| 6,741,738 B2 * | 5/2004 | Taylor | .......................... | 382/187 |
| 7,298,902 B2 * | 11/2007 | Cichielo et al. | .............. | 382/184 |
| 2004/0202992 A1 * | 10/2004 | Moulthrop et al. | .......... | 434/353 |
| 2006/0062453 A1 * | 3/2006 | Schacht | ........................ | 382/164 |
| 2006/0194187 A1 * | 8/2006 | Saito | ............................. | 434/353 |
| 2006/0252023 A1 * | 11/2006 | Cui | ............................... | 434/353 |
| 2006/0257841 A1 * | 11/2006 | Mangano | ...................... | 434/354 |
| 2007/0178432 A1 * | 8/2007 | Davis et al. | .................. | 434/353 |
| 2009/0238464 A1 * | 9/2009 | Ohira | ............................ | 382/190 |
| 2009/0282009 A1 * | 11/2009 | Levey et al. | ...................... | 707/4 |
| 2012/0189999 A1 | 7/2012 | Uthman et al. | | |

\* cited by examiner

*Primary Examiner* — James Hull
(74) *Attorney, Agent, or Firm* — Jones Robb, PLLC (57) ABSTRACT

A method, a system, and a computer program product for creating an assessment model are disclosed. Marked regions in an electronic document are identified. Thereafter, mark-ups within the marked regions are identified. Based on the identified marked regions and mark-ups the assessment model is created.

10 Claims, 5 Drawing Sheets

A. HAVE YOU EVER HEARD OF THE MAN IN THE MOON? MANY PEOPLE SAY THEY CAN SEE A MAN'S FACE ON THE SURFACE OF THE MOON. IT'S NOT REALLY A FACE, OF COURSE. INSTEAD, THE "FACE" IS A PATTERN MADE BY CRATERS AND MOUNTAINS ON THE MOON'S SURFACE. WHEN THE MOON IS FULL AND THE SKY IS CLEAR, WE SEE SOME OF THOSE HOLES AND HILLS.

1. WHAT IS THE BEST TITLE FOR THIS STORY?
    - A. "THE MOON AND STARS"
    - B. "A FULL MOON"
    - C. "PEOPLE LAND ON THE MOON"
    - D. "THE MAN IN THE MOON"

2. IN THIS STORY, THE WORD CRATERS MEANS
    - A. HOLES.
    - B. MOONS.
    - C. MOUNTAINS.
    - D. NIGHTS.

3. YOU CAN SEE THE MAN IN THE MOON BEST WHEN THE MOON IS
    - A. HIDDEN.
    - B. NEW.
    - C. FULL.
    - D. FLAT.

4. YOU WOULD PROBABLY FIND THIS STORY IN A
    - A. SCIENCE BOOK.
    - B. DICTIONARY.
    - C. POETRY BOOK.
    - D. TRAVEL GUIDE.

CREATING ASSESSMENT MODEL FOR EDUCATIONAL ASSESSMENT SYSTEM

COPYRIGHT NOTICE

A portion of the disclosure of this patent document contains material that is subject to copyright protection. The copyright owner has no objection to facsimile reproduction by anyone of the patent document or the patent disclosure as it appears in the Patent and Trademark Office patent file or records but otherwise reserves all copyright rights whatsoever.

TECHNICAL FIELD

The presently disclosed embodiments are directed to assessment of documents. More particularly, the presently disclosed embodiments are directed to a technique for creating an assessment model for assessing answers contained in a document.

BACKGROUND

Recently, assessment systems find increased usage and help various users, such as, teachers to individualize instruction for students and maximize educational experience. The assessment systems are used to provide grades and reports on students' progress. To provide grades, the assessment systems require a model of the assessment to know how to extract the answers marked by students on a document. There are tools provided in the assessment systems for building assessment models but, they require an intensive training to learn how to use them.

SUMMARY

According to embodiments illustrated herein, there is provided a method for creating an assessment model for an educational assessment system. The master document that is marked by a user is scanned to generate an electronic document. One or more marked regions in the electronic document are identified. Further one or more mark-ups within the one or more marked regions are identified. The one or more mark-ups correspond to containments within the one or more marked regions. Based on the identified one or more mark-ups and the one or more marked regions, the assessment model is generated, wherein the assessment model is implementable by the educational assessment system to assess answers contained in the assessment document.

According to embodiments illustrated herein, there is provided an educational assessment system for creating an assessment model. The educational assessment system includes an identification module and a model creation module. The identification module identifies one or more marked regions in an electronic document, wherein the electronic document is obtainable by scanning a master document marked by a user. The identification module further identifies one or more mark-ups within the one or more marked regions, wherein the one or more mark-ups correspond to containments within the one or more marked regions. Based on the identified one or more mark-ups and the one or more marked regions, a model creation module creates the assessment model. The assessment model is implementable to assess answers contained in the assessment document.

According to embodiments illustrated herein, there is provided a computer program product for creating an assessment model for an educational assessment system. The computer program product includes a computer readable program code. The computer readable program code includes a program instruction means for identifying one or more marked regions in an electronic document, wherein the electronic document is obtainable by scanning the document marked by a user. A program instruction means is provided for identifying one or more mark-ups within the one or more marked regions, wherein the one or more mark-ups correspond to containments within the one or more marked regions. The computer readable program code further includes a program instruction means for creating the assessment model based on the identified one or more mark-ups and the one or more marked regions. The assessment model is implementable by the educational assessment system to assess answers contained in the assessment document.

BRIEF DESCRIPTION OF DRAWINGS

The accompanying drawings, which are incorporated in illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples, one element may be designed as multiple elements or that multiple elements may be designed as one element. In some examples, an element shown as an internal component of another element may be implemented as an external component and vice versa. Furthermore, elements may not be drawn to scale.

Various embodiments will hereinafter be described in accordance with the appended drawings provided to illustrate and not to limit the scope in any manner, wherein like designations denote similar elements, and in which.

DETAILED DESCRIPTION

The present disclosure is best understood with reference to the detailed figures and description set forth herein. Various embodiments are discussed below with reference to the figures. However, those skilled in the art will readily appreciate that the detailed description given herein with respect to these figures is just for explanatory purposes as the method and the system extend beyond the described embodiments. For example, those skilled in the art will appreciate, in light of the teachings presented, recognizing multiple alternate and suitable approaches, depending on the needs of a particular application, to implement the functionality of any detail described herein, beyond the particular implementation choices in the following embodiments described and shown.

References to "one embodiment", "an embodiment", "one example", "an example", "for example" and so on, indicate that the embodiment(s) or example(s) so described may include a particular feature, structure, characteristic, property, element, or limitation, but not every embodiment or example necessarily includes that particular feature, structure, characteristic, property, element or limitation. Furthermore, repeated use of the phrase "in an embodiment" does not necessarily refer to the same embodiment, though it may.

Definitions: The following terms shall have, for the purposes of this application, the respective meanings set forth below.

"Scanning" refers to a technique of recording an image as digital data in any format, thereby creating an electronic document.

A "master document" refers to any piece of paper marked by a user (e.g., teacher). The paper corresponds to a question paper or an assessment paper to assess students' responses. The question paper or the assessment paper contains one or more questions for which the students' responses (e.g., answers) are desired.

An "electronic document" or "digital image" or "scanned document" or "scanned image" refers to a collection of data, including image data in any format, retained in an electronic form. The electronic document can contain one or more pictures, symbols, text, blank or non-printed regions, margins, etc. In an embodiment, the electronic document is obtained by scanning a corresponding master document marked by the teacher. The electronic document can be stored in various file formats, such as, JPG or JPEG, GIF, TIFF, PNG, BMP, RAW, PSD, PSP, PDF, and the like.

A "marked region" refers to a region marked by the teacher in the document. In an embodiment, the marked regions comprises one or more regions highlighted with one or more colors or regions marked with at least one of one or more geometrical shapes or one or more hand-drawn shapes may be by using a highlighter pen or any other suitable writing aid.

A "mark-up" refers to any containment within the marked region. In an embodiment, the mark-up comprises at least one of handwritten text, one or more symbols, one or more marks, one or more geometrical shapes, or one or more hand-drawn shapes present within any marked region.

An "assessment model" refers to a mathematical representation (e.g., an XML blob) of the assessment (e.g., the question paper or the assessment paper) that is used by the assessment system during the grading process. The assessment model facilitates identification of areas where the assessment system should be looking for the marked regions and the mark-ups, or where handwriting recognition should be applied, for accessing the answers placed in the document.

A method, system, and computer program product for creating an assessment model are disclosed. A user, such as, a teacher creates a master document, such as, a question paper using various computer applications, such as, MS Word®, MS PowerPoint®, MS Excel®, Adobe Acrobat®, MS Paint, and so forth. In an embodiment, the master document can be handwritten. Further, it is understood by those skilled in the art that the master document can be prepared using any suitable technique (e.g. printing) or using any computer application. The ongoing description is not limited with respect to preparation of the master document for which the assessment model will be created.

The user (e.g., the teacher) then defines one or more marked regions in the master document. For example, a multiple choice question in the master document is highlighted with a blue box (e.g., marked region) to define the area of the multiple choice question. As another example, a fill-in-the-box question (e.g., a simple math question) would be marked with a yellow box. Similarly, various areas containing respective questions are defined by the teacher by defining various marked regions. The teacher then defines one or more mark-ups within the one or marked regions. For example, each available option for the multiple choice question is marked with either a red box or a yellow (mark-up) indicating a wrong answer or a right answer, respectively. As another example, in case of the fill-in-the-box type question, the correct answer would be written in red (mark-up) inside the yellow box. Similarly, such mark-ups can be made for the remaining questions in the master document. Subsequently, the master document is scanned to generate an electronic document. It is understood by a person having ordinary skill in the art that the electronic document also contains the marked regions and the mark-ups. The electronic document (e.g., the scanned document) is then processed by an assessment system to generate an assessment model.

Figure 1:
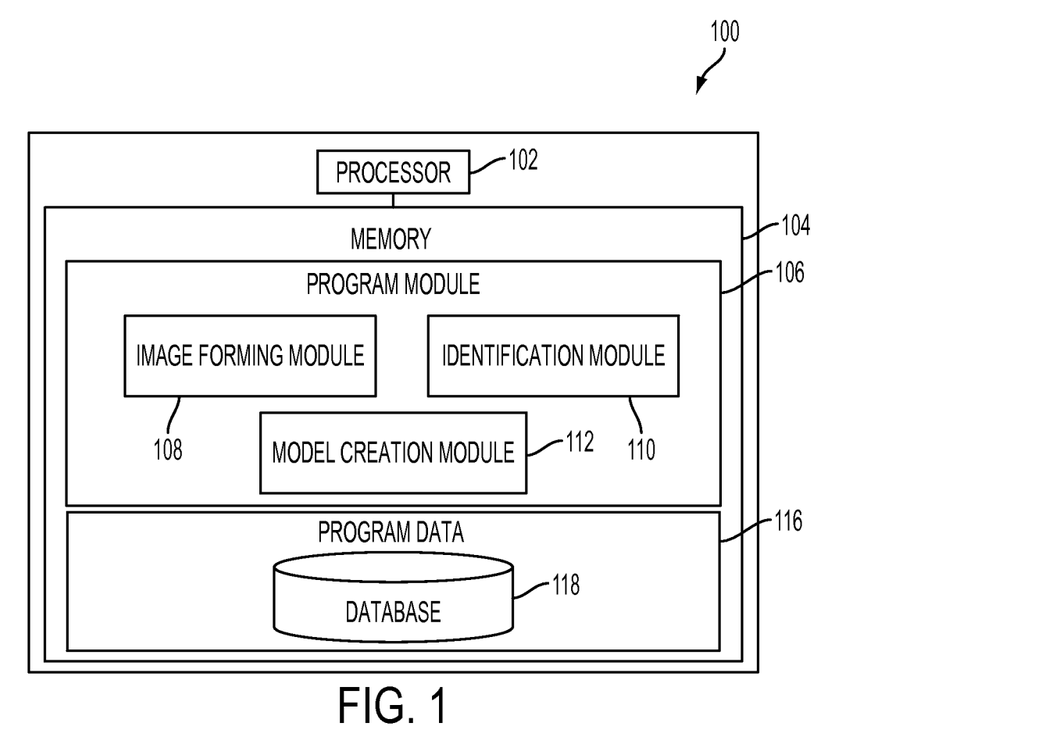
FIG. 1 is a block diagram illustrating an educational assessment system for creating an assessment model, in accordance with an embodiment.

FIG. 1 is a block diagram illustrating an educational assessment system 100 for creating an assessment model, in accordance with an embodiment. The educational assessment system 100 includes a processor 102 and a memory 104. The memory 104 includes a program module 106, and a program data 116. The program module 106 includes an image-scanning module 108, an identification module 110, and a model creation module 112. The program data 116 includes a database 118.

The processor 102 is coupled to a display (not shown), one or more input mediums (not shown), and the memory 104. The processor 102 executes a set of instructions stored in the memory 104 to perform one or more operations. The processor 102 can be realized through a number of processor technologies known in the art. Examples of the processor 102 include be, but are not limited to, X86 processor, RISC processor, ASIC processor, CISC processor, or any other processor. In an embodiment, the processor 102 includes a Graphics Processing Unit (GPU) that executes the set of instruction to perform one or more image processing operations.

The memory 104 stores set of instructions and data. Some of the commonly known memory implementations can be, but not limited to, a random access memory (RAM), read only memory (ROM), hard disk drive (HDD), and secure digital (SD) card. The program module 106 includes a set of instructions that are executable by the processor 102 to perform various operations.

As explained earlier, the user marks the master document using various colors, geometrical shapes, hand-drawn shapes, symbols, or marks, by using color highlighter pens or any other suitable writing aid. The user (e.g., the teacher) defines one or more marked regions in the master document. The user further defines one or more mark-ups (e.g., containment within marked regions) within the one or marked regions. The one or more marked regions and the one or more mark-ups can be defined using hand-drawn shapes or color highlights.

The image-scanning module 108 facilitates the scanning of the master document to create an electronic document (e.g., a scanned document). The image-scanning module 108 facilitates the compilation of the image data captured by various image capturing units (not shown) such as scanners and digital cameras to form the digital image. In an embodiment, the image capturing units implements various CCD devices and/or CMOS devices to capture the digital images.

In an embodiment, the image capturing units implement a linear scanning technique. In another embodiment, the image capturing units implement a two-dimensional scanning technique. The image-scanning module 108 stores the scanned documents (e.g., digital images) in the database 118.

The word "scanner" used herein encompasses any apparatus, such as a digital imager, a copier, and a multi-function machine, which performs a scan output function for any purpose.

In another embodiment, any electronic document with such marked regions and mark-ups can be processed by the educational assessment system 100 and the scanning can be avoided. For example, the one or more marked regions and the one or more markups can be defined by the user drawing color rectangles using various computer applications, such as, MS Word®, MS PowerPoint®, MS Excel®, Adobe Acrobat®, MS Paint, and so forth.

Figure 2:
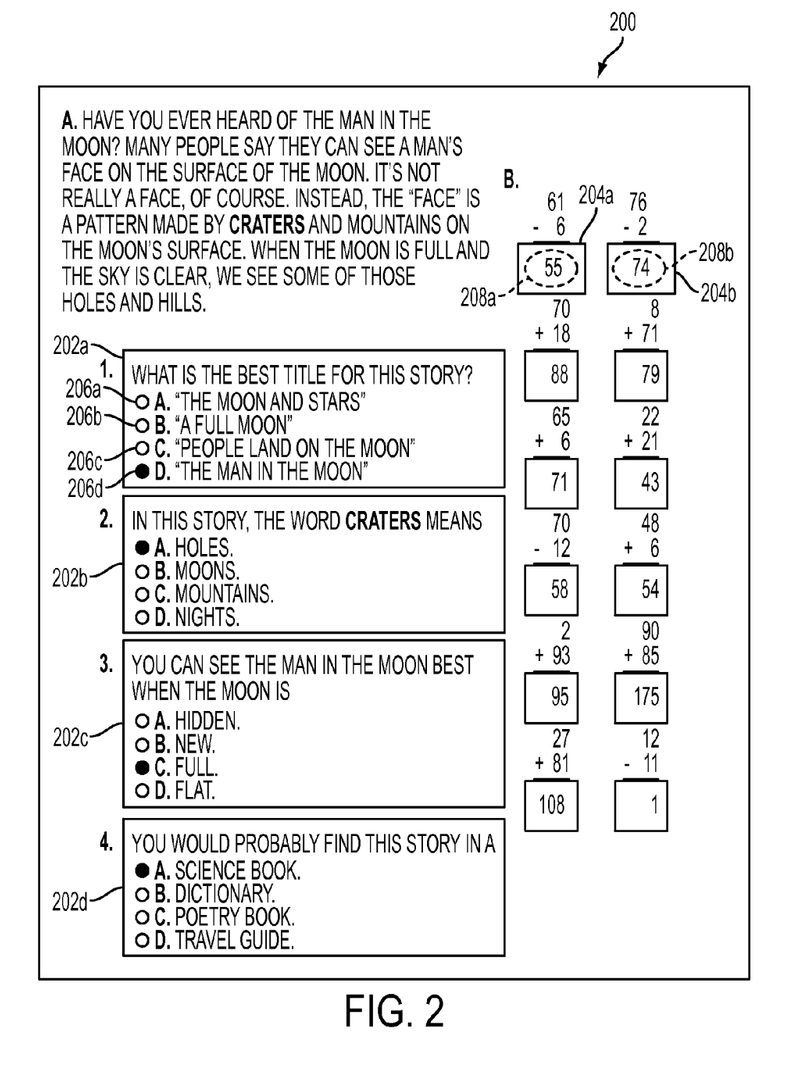
FIG. 2 depicts an electronic document in accordance with an embodiment.

As shown in FIG. 2, the electronic document (e.g., an electronic document 200) contains one or more marked regions (e.g., one or more marked regions 202*a*, 202*b*, 202*c*, 202*d*, 204*a*, and 204*b*) and one or more mark-ups (e.g. 206*a*, 206*b*, 206*c*, 206*d*, 208*a*, and 208*b*). Examples of the one or more marked regions include but, are not limited to, one or more regions highlighted with colors, one or more marked regions marked with geometrical shapes, and one or more regions marked with hand-drawn shapes. Examples of the one or more mark-ups include but, are not limited to, handwritten text, one or more regions highlighted with colors, one or more symbols, one or more marks, one or more geometrical shapes, and one or more hand-drawn shapes.

The identification module 110 identifies the one or more marked regions. Further, the identification module 110 searches for the one or more mark-ups within the one or more marked regions in the electronic document. In an embodiment, the identification module 110 may be implemented using various mark and/or character recognition techniques capable of identifying various shapes, colors, marks, symbols, and so forth. Further, the implemented recognition technique is capable of recognizing handwriting. For example, in one embodiment a chain-code image processing algorithm is implemented by the identification module 110 to identify marked regions by looking for the bounding rectangle of a region drawn in a specific color, e.g., a rectangle drawn around a region of interest using a blue highlighter. Further, the same type of algorithm could be used to identify a mark-up within the marked region but drawn with, for example, a red or yellow highlighter pen. Further, a similar image processing algorithm could look for red writing within a marked region and automatically perform handwriting recognition on the red text (mark-up). Thereafter, the identification module 110 supplies information corresponding to the identified one or more marked regions and the one or more mark-ups to the model creation module 112.

The model creation module 112 creates the assessment model for assessments of assessment documents (e.g., the question papers or assessment papers filled by the students) based on the identified one or more marked regions and one or more mark-ups. The assessment model allows the users (e.g., teacher) to give assessments to students frequently in an easy and convenient way. The assessment model enables an automated assessment of documents (e.g., question papers with answers filled by students). The assessment model is a mathematical representation (e.g., an XML blob) of the assessment (e.g., the question paper or the assessment paper) that is used by the educational assessment system 100 to identify areas where the educational assessment system 100 should be looking for the marked regions and the mark-ups, or where handwriting recognition should be applied, for accessing the answers placed in the document. In an embodiment, once generated, the assessment model is stored in the database 118.

FIG. 2 depicts the electronic document 200 in accordance with an embodiment. The electronic document 200 contains the one or more marked regions 202*a*, 202*b*, 202*c*, and 202*d*, hereinafter referred to as marked regions 202. The electronic document 200 also includes one or more marked regions 204*a* and 204*b*, hereinafter referred to as marked regions 204. In an embodiment, the marked regions 202 enclose multiple choice questions. For example, the marked region 202*a* encloses a first question and associated multiple options for a possible answer for the first question. Further, the marked regions 204 are formed by highlighting the respective areas on the document using one or more colors. In an embodiment, the marked regions 204 indicate areas where users, such as, students might fill their answers or comments for various problems. For example, the marked region 204*a* represents an area where a student may write an answer for a problem, such as, 61-6 (e.g., a math problem shown just above marked region 204*a*).

The electronic document 200 further contains the one or more mark-ups 206*a*, 206*b*, 206*c* and 206*d*, hereinafter referred to as mark-ups 206 within the marked regions 202*a*. Further, one or more mark-ups 208*a* and 208*b*, hereinafter referred to as mark-ups 208 within the marked regions 204. In an embodiment, the mark-ups 206 depict possible options for the multiple choice question. For example, the mark-ups 206*a*, 206*b* and 206*c* are highlighted with similar color (e.g., red) which depict that the options corresponding to mark-ups 206*a*, 206*b* and 206*c* are wrong answers for the first question. The mark-up 206*d* can be highlighted with another color (e.g., yellow) to indicate that the option corresponding to mark-up 206*d* is a correct answer to the first question. Thus, the teacher can highlight correct answers for each multiple choice question with similar color (e.g., yellow) and wrong answers with red (or any other color). In an embodiment, the mark-ups 208 represent the text written by the students as answer or comments to various problems. For example, the mark-up 208*a* represents an answer written for a math problem (as depicted by the possible questions '61-6,' '76-2', etc.).

Figure 3:
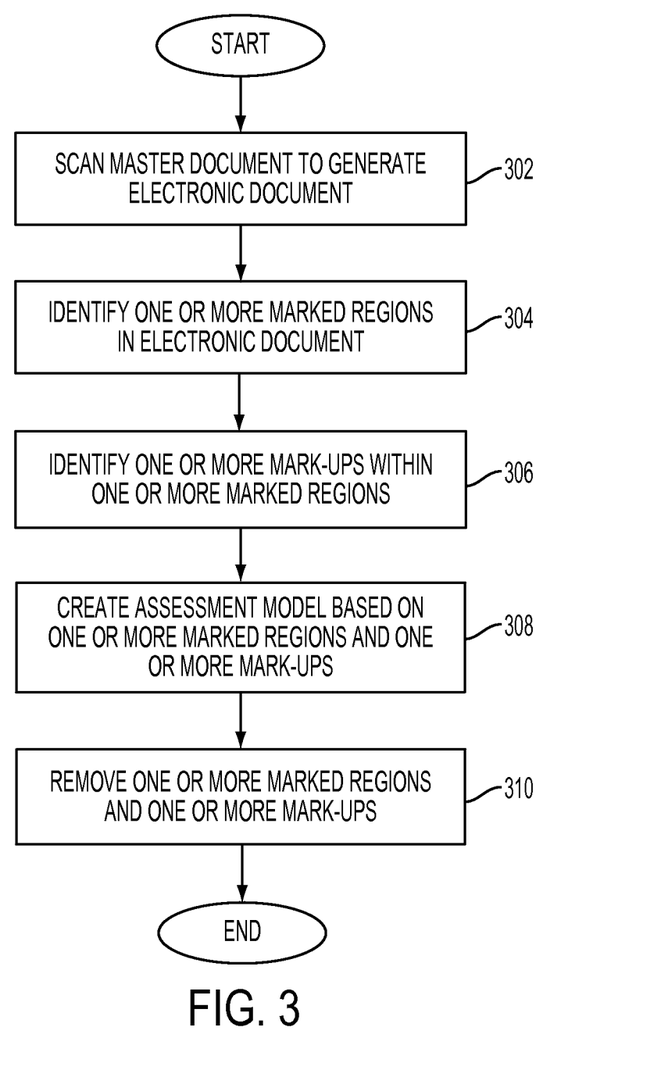
FIG. 3 is a flow diagram illustrating a method for creating an assessment model, in accordance with an embodiment.

FIG. 3 is a flow diagram illustrating a method for creating the assessment model, in accordance with an embodiment.

At step 302, the master document marked by the teacher is scanned to generate the electronic document. In an embodiment, the scanning of the document is facilitated by the image-scanning module 108.

At step 304, the marked regions 202 and 204 as depicted in FIG. 2 are identified. The one or more marked regions 202 represent multiple choice questions and the one or more marked regions 204 indicate areas where the users (e.g., students) can fill their answers or comments for various problems. In an embodiment, the marked regions 202 and 204 are identified by the identification module 110. In an embodiment, the identification module 110 is configured to identify various regions marked with different geometric shapes, and hand-drawn shapes as marked regions 202. In another embodiment, the identification module 110 is configured to identify regions marked with yellow color as the marked regions 204.

At step 306, the mark-ups 206 and 208 within the marked regions 202 and 204 are identified. In an embodiment, the mark-ups 206 and 208 are identified by the identification module 110. Once the marked regions 202 and 204 are identified, and the mark-ups within the marked regions 202 and 204 are searched by the identification module 110. Various color highlights, marks, symbols, or handwritten text within the marked regions 202 and 204 can be identified as the mark-ups 206 and 208 by the identification module 110. In an embodiment, a handwritten text (e.g., mark-up 208a) is recognized using one or more handwriting recognition techniques.

At step 308, the assessment model is created based on the identified marked regions 202 and 204 and the identified mark-ups 206 and 208.

At step 310, an assessment document (e.g. a question paper) is generated by removing the marked regions 202 and 204 and the mark-ups 206 and 208 from the electronic document 200. Subsequently, the assessment document is stored in the database 118. In an embodiment, the marked regions 202 and 204 and the mark-ups 206 and 208 are removed by, for example, by deleting any pixels spots in the image that are not black, thus erasing all color marked regions and the mark-ups. However, it should be clear that the ongoing description is not limited with respect to the techniques of removing marked regions 202 and 204 and mark-ups 206 and 208.

Figure 5:
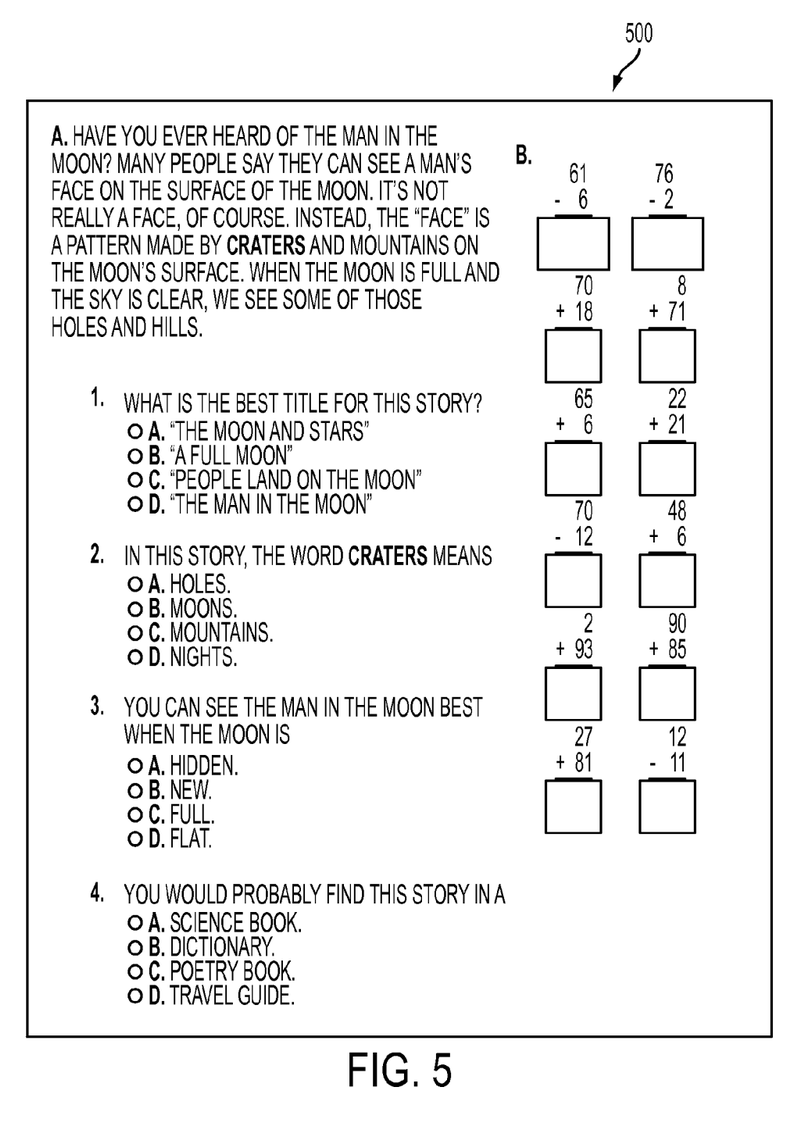
FIG. 5 depicts an assessment document in accordance with an embodiment.

The assessment document can be printed when the user (e.g., teacher) is ready to give an assessment to the students. In an embodiment, the assessment document is created by the model creation module 112. Further, the assessment document is depicted in FIG. 5.

Figure 4:
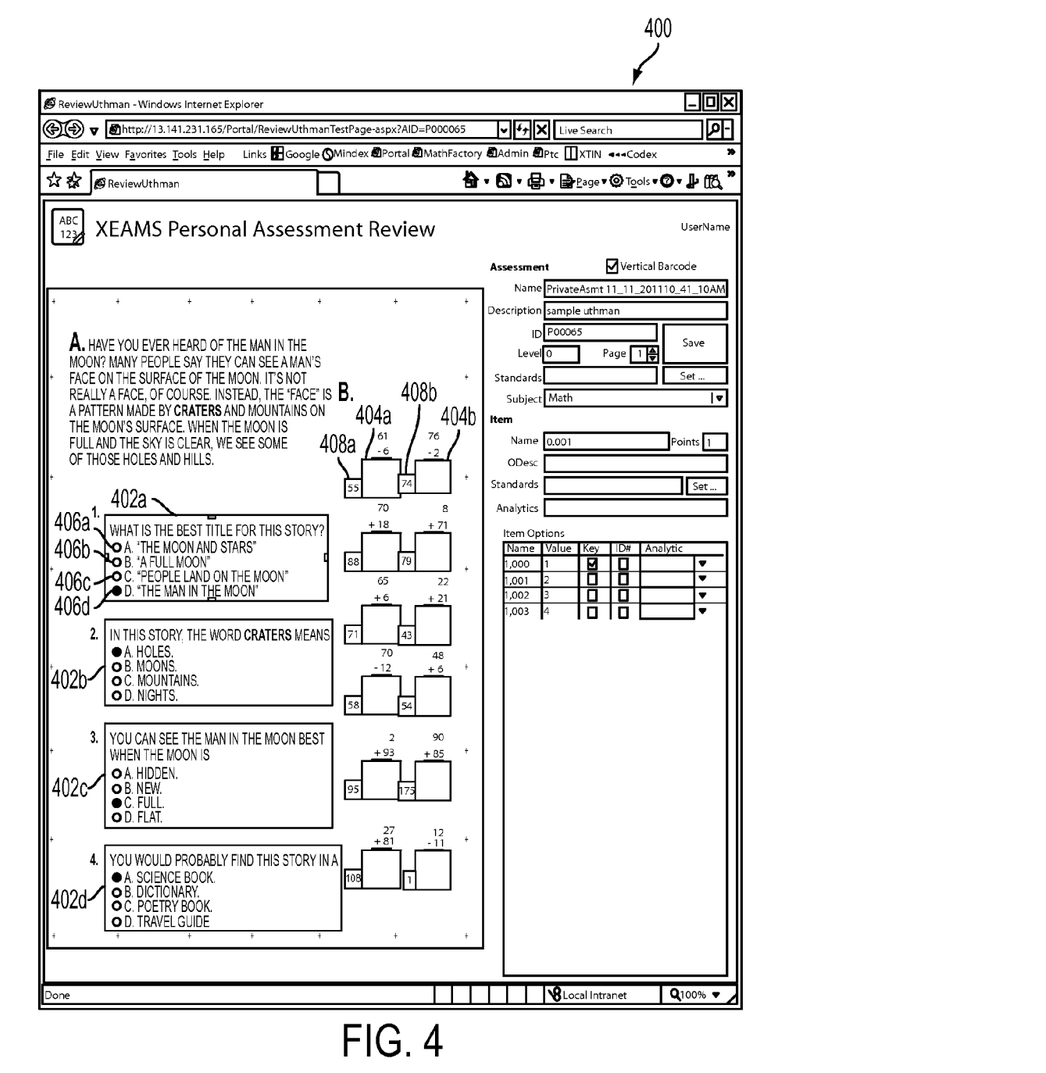
FIG. 4 depicts a Graphical User Interface (GUI) for enabling the user to interact with an assessment model in accordance with an embodiment.

FIG. 4 depicts a Graphical User Interface (GUI) 400 for enabling the user to interact with the assessment model in accordance with an embodiment which is created based on the identified marked regions 202 and 204 and the identified mark-ups 206 and 208 in FIG. 2. Regions 402a, 402b, 402c and 402d in the GUI 400 correspond to the marked regions 202a, 202b, 202c and 202d, respectively, in the electronic document 200. Regions 402a, 402b, 402c and 402d represent multiple choice questions. Regions 404a and 404b correspond to the marked regions 204a and 204b, respectively. In an embodiment, the GUI 400 enables the user to edit the assessment model. For example, in an embodiment, the GUI 400 allows the user to make corrections and add additional metadata if desired.

Regions 406a, 406b, 406c and 406d correspond to the mark-ups 206a, 206b, 206c, and 206d, respectively. Similarly, regions 408a and 408b correspond to the mark-ups 208a and 208b, respectively. The regions 408a and 408b depict numbers that are recognized from the mark-ups 208a and 208b (e.g., handwritten answers).

Once the assessment model is created, it serves as a template for evaluating answers filled by students in the question paper. For example, if a student writes '50' in region 204a (e.g., marked region 204a), the educational assessment system 100 will compare it with corresponding mark-up 208a (e.g., correct answer, which is '55' represented by region 408a). Based on the comparison, the answer provided (in this case, '50') by the student will be considered as a wrong answer.

FIG. 5 depicts an assessment document 500 (e.g., a question paper) in accordance with an embodiment. The assessment document 500 is generated by removing the one or more marked regions 202 and 204 and the one or more mark-ups 206 and 208 from the electronic document 200 after creating the assessment model. FIG. 5 shows a clean document (e.g., with no marked regions and mark-ups). In an embodiment, the assessment document 500 is stored in the database 118.

The disclosed methods and systems, as described in the ongoing description or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, etc. The storage device may also be other similar means for loading computer programs or other instructions into the computer system. The computer system also includes a communication unit. The communication unit allows the computer to connect to other databases and the Internet through an Input/output (I/O) interface, allowing the transfer as well as reception of data from other databases. The communication unit may include a modem, an Ethernet card, or other similar devices, which enable the computer system to connect to databases and networks, such as, LAN, MAN, WAN, and the Internet. The computer system facilitates inputs from a user through input device, accessible to the system through an I/O interface.

The computer system executes a set of instructions that are stored in one or more storage elements, in order to process input data. The storage elements may also hold data or other information as desired. The storage element may be in the form of an information source or a physical memory element present in the processing machine.

The programmable or computer readable instructions may include various commands that instruct the processing machine to perform specific tasks, such as, the steps that constitute the method of the disclosure. The method and systems described can also be implemented using only software programming or using only hardware or by a varying combination of the two techniques. The disclosure is independent of the programming language and the operating system used in the computers. The instructions for the disclosure can be written in all programming languages including, but not limited to 'C', 'C++', 'Visual C++' and 'Visual Basic'. Further, the software may be in the form of a collection of separate programs, a program module with a larger program or a portion of a program module, as in the disclosure. The software may also include modular programming in the form of object-oriented programming. The processing of input data by the processing machine may be in response to user commands, results of previous processing or a request made by another processing machine. The disclosure can also be implemented in various operating systems and platforms including, but not limited to, 'Unix', DOS', 'Android', 'Symbian', and 'Linux'.

The programmable instructions can be stored and transmitted on a computer-readable medium. The disclosure can also be embodied in a computer program product comprising a computer-readable medium, with the product capable of implementing the above methods and systems, or the numerous possible variations thereof.

The method, system, and computer program product, as described above, have numerous advantages. Some of these advantages may include, but are not limited to, assessing documents to provide detailed and up-to-date information on student progress. The system also allows a user, such as, teacher to create their own assessment models (e.g., document templates) with any form of text fields and regions to provide inputs.

Various embodiments of the method and system for creating an assessment model have been disclosed. It should be apparent, however, to those skilled in the art that many more modifications besides those already described are possible without departing from the inventive concepts herein. The embodiments, therefore, are not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

It will be appreciated by a person skilled in the art that the system, modules, and sub-modules have been illustrated and explained to serve as examples and should not be considered limiting in any manner. It will be appreciated that the variants of the above disclosed system elements, or modules and other features and functions, or alternatives thereof, may be combined to create many other different systems or applications.

Those skilled in the art will appreciate that any of the foregoing steps and/or system modules may be suitably replaced, reordered, or removed, and additional steps and/or system modules may be inserted, depending on the needs of a particular application, and that the systems of the foregoing embodiments may be implemented using a wide variety of suitable processes and system modules and are not limited to any particular computer hardware, software, middleware, firmware, microcode, etc.

The claims can encompass embodiments for hardware, software, or a combination thereof.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for creating an assessment model for an educational assessment system, the method comprising:

scanning, by one or more processors, a master document to generate an electronic document, wherein the master document is marked by a user;

identifying, by the one or more processors, one or more marked regions in the electronic document, wherein a first type of marked region that comprises a first predetermined indicator is associated with a first type of answer input and a second type of marked region that comprises a second predetermined indicator is associated with a hand-written answer input;

identifying, by the one or more processors, one or more mark-ups within the one or more marked regions, the one or more mark-ups corresponding to contents within the one or more marked regions, the identifying being performed using a chain-code image processing algorithm, wherein:

the first predetermined indicator comprises a first predetermined shape in a first predetermined color, and the mark-ups within the first type of marked region are identified using the chain-code image processing algorithm based on the first type of answer input, first predetermined shape, and the first predetermined color, and the second predetermined indicator comprises a second predetermined shape in a second predetermined color, and the mark-ups within the second type of marked region are identified using the chain-code image processing algorithm such that handwriting recognition techniques are used to identify hand written mark-ups in a third predetermined color based on the second predetermined shape and the second predetermined color;

creating, by the one or more processors, the assessment model based on the one or more marked regions and the one or more mark-ups using the chain-code image processing algorithm, wherein the assessment model comprises one or more key regions corresponding to the one or more marked regions that are used to assess answers contained in one or more assessment documents, and for a key region that corresponds to the first type of marked region, answers are assessed based on the first type of answer input, and for a key region that corresponds to a second type of marked region, answers are assessed based on the hand-written answer input;

editing, by a user, the created assessment model via a graphical user interface (GUI) such that at least one of the key regions is edited by adjusting a value of the key region;

removing, by the one or more processors, the one or more marked regions and the one or more mark-ups from the electronic document to generate the one or more assessment documents;

receiving a completed assessment document generated by the removing, wherein the completed assessment document comprises mark-ups that correspond to answers; and assessing the accuracy of the mark-ups of the completed assessment document based on the created and edited assessment model, wherein the assessment model is used to identify locations for the mark-ups of the completed assessment document based on the one or more identified marked regions used to create the assessment model, the at least one edited key region of the assessment model is used to assess the accuracy of at least one of the mark-ups of the completed assessment document by comparing the adjusted value of the key region with a value corresponding to the at least one mark-up of the completed assessment document, and for at least one key region that corresponds to the second type of marked region and the hand-written answer input, performing handwriting recognition techniques on the answer such that the recognized handwriting is compared to the key region that correspond to the at least one key region.

2. The method of claim 1, wherein the electronic document is a digital image.

3. The method of claim 1, wherein the electronic document is a digital image and the one or more marked regions comprise one or more regions highlighted with one or more colors.

4. The method of claim 1, wherein removing the one or more marked regions and the one or more mark-ups comprises removing any mark from the electronic document that does not match a predefined color.

5. The method of claim 1, wherein
the first type of answer input indicated by the predetermined first indicator comprises a multiple choice answer input.

6. An educational assessment system for creating an assessment model, the educational assessment system comprising:
one or more processors configured to:
identify one or more marked regions in an electronic document, wherein the electronic document is obtainable by scanning a master document marked by a user, wherein a first type of marked region that comprises a first predetermined indicator is associated with a first type of answer input and a second type of marked region that comprises a second predetermined indicator is associated with a hand-written answer input;
identify one or more mark-ups within the one or more marked regions, the one or more mark-ups corresponding to contents within the one or more marked regions, the identifying being performed using a chain-code image processing algorithm, wherein
the first predetermined indicator comprises a first predetermined shape in a first predetermined color, and the mark-ups within the first type of marked region are identified using the chain-code image processing algorithm based on the first type of answer input, first predetermined shape, and the first predetermined color, and
the second predetermined indicator comprises a second predetermined shape in a second predetermined color, and the mark-ups within the second type of marked region are identified using the chain-code image processing algorithm such that handwriting recognition techniques are used to identify hand written mark-ups in a third predetermined color based on the second predetermined shape and the second predetermined color;
create the assessment model based on the one or more marked regions and the one or more mark-ups using the chain-code image processing algorithm, wherein the assessment model comprises one or more key regions corresponding to the one or more marked regions that are used to assess answers contained in one or more assessment documents, and
for a key region that corresponds to the first type of marked region, answers are assessed based on the first type of answer input, and for a key region that corresponds to the second type of marked region, answers are assessed based on the hand-written answer input;
edit, by a user, the created assessment model via a graphical user interface (GUI) such that at least one of the key regions is edited by adjusting a value of the key region; and
remove the one or more marked regions and the one or more mark-ups from the electronic document to generate the one or more assessment documents;
receive a completed assessment document generated by the removing, wherein the completed assessment document comprises mark-ups that correspond to answers; and
assess the accuracy of the mark-ups of the completed assessment document based on the created and edited assessment model, wherein
the assessment model is used to identify locations for the mark-ups of the completed assessment document based on the one or more identified marked regions used to create the assessment model,
the at least one edited key region of the assessment model is used to assess the accuracy of at least one of the mark-ups of the completed assessment document by comparing the adjusted value of the key region with a value corresponding to the at least one mark-up of the completed assessment document, and
for at least one key region that corresponds to the second type of marked region and the handwritten answer input, performing handwriting recognition techniques on the answer such that the recognized handwriting is compared to the key region that correspond to the at least one key region.

7. The system of claim 6, wherein the one or more processors are further configured to facilitate scanning of the master document to obtain the electronic document.

8. The system of claim 6, wherein
the first type of answer input indicated by the predetermined first indicator comprises a multiple choice answer input.

9. A computer program product for use with a computing device, the computer program product comprising a non-transitory computer readable medium, the non-transitory computer readable medium stores a computer program code for creating an assessment model for an educational assessment system, the computer program code is executable by one or more processors in the computing device to:
identify one or more marked regions in an electronic document, wherein
the electronic document is obtainable by scanning a master document marked by a user, and
a first type of marked region that comprises a first predetermined indicator is associated with a first type of answer input and a second type of marked region that comprises a second predetermined indicator is associated with a hand-written answer input;
identify one or more mark-ups within the one or more marked regions,
the one or more mark-ups corresponding to contents within the one or more marked regions, the identifying being performed using a chain-code image processing algorithm, wherein
the first predetermined indicator comprises a first predetermined shape in a first predetermined color, and the mark-ups within the first type of marked region are identified using the chain-code image processing algorithm based on the first type of answer input, first predetermined shape, and the first predetermined color, and
the second predetermined indicator comprises a second predetermined shape in a second predetermined color, and the mark-ups within the second type of marked region are identified using the chain-code image processing algorithm such that handwriting recognition techniques are used to identify hand written mark-ups in a third predetermined color based on the second predetermined shape and the second predetermined color;
create the assessment model based on the one or more marked regions and the one or more mark-ups using the chain-code image processing algorithm, wherein
the assessment model comprises one or more key regions corresponding to the one or more marked regions that are used to assess answers contained in one or more assessment documents, and
for a key region that corresponds to the first type of marked region, answers are assessed based on the first type of answer input, and for a key region that corresponds to the second type of marked region, answers are assessed based on the hand-written answer input;
edit, by a user, the created assessment model via a graphical user interface (GUI) such that at least one of the key regions is edited by adjusting a value of the key region; and
remove the one or more marked regions and the one or more mark-ups from the electronic document to generate the one or more assessment documents;
receive a completed assessment document generated by the removing, wherein the completed assessment document comprises mark-ups that correspond to answers; and
assess the accuracy of the mark-ups of the completed assessment document based on the created and edited assessment model, wherein
the assessment model is used to identify locations for the mark-ups of the completed assessment document based on the one or more identified marked regions used to create the assessment model;
the at least one edited key region of the assessment model is used to assess the accuracy of at least one of the mark-ups of the completed assessment document by comparing the adjusted value of the key region with a value corresponding to the at least one mark-up of the completed assessment document, and
for at least one key region that corresponds to the second type of marked region and the hand-written answer input, performing handwriting recognition techniques on the answer such that the recognized handwriting is compared to the key region that correspond to the at least one key region.

10. The computer program product of claim 9, wherein the first type of answer input indicated by the predetermined first indicator comprises a multiple choice answer input.

* * * * *